(12) United States Patent
Sugaya et al.

(10) Patent No.: US 10,690,097 B2
(45) Date of Patent: Jun. 23, 2020

(54) ELECTROMAGNETIC VALVE

(71) Applicant: HITACHI AUTOMOTIVE SYSTEMS, LTD., Hitachinaka-shi, Ibaraki (JP)

(72) Inventors: Masashi Sugaya, Hitachinaka (JP); Kiyotaka Ogura, Hitachinaka (JP); Takao Miyake, Hitachinaka (JP); Yoshihito Yasukawa, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/754,499

(22) PCT Filed: Jul. 25, 2016

(86) PCT No.: PCT/JP2016/071661
§ 371 (c)(1),
(2) Date: Feb. 22, 2018

(87) PCT Pub. No.: WO2017/033645
PCT Pub. Date: Mar. 2, 2017

(65) Prior Publication Data
US 2018/0252192 A1 Sep. 6, 2018

(30) Foreign Application Priority Data
Aug. 25, 2015 (JP) .................. 2015-165357

(51) Int. Cl.
*F02M 51/06* (2006.01)
*H01F 7/16* (2006.01)
(Continued)

(52) U.S. Cl.
CPC ........ *F02M 51/0685* (2013.01); *F02M 51/06* (2013.01); *F02M 51/0682* (2013.01);
(Continued)

(58) Field of Classification Search
CPC ........... F02M 51/0685; F02M 51/0682; F02M 51/06; F02M 51/061; F02M 51/0621;
(Continued)

(56) References Cited

U.S. PATENT DOCUMENTS

| 5,626,165 A | 5/1997 | Shinobu |
| 2003/0102386 A1 | 6/2003 | Sebastian et al. |

(Continued)

FOREIGN PATENT DOCUMENTS

| JP | S64-011484 U | 1/1989 |
| JP | H08-114277 A | 5/1996 |

(Continued)

OTHER PUBLICATIONS

International Search Report with English translation and Written Opinion issued in corresponding application No. PCT/JP2016/071661 dated Nov. 1, 2016.
(Continued)

*Primary Examiner* — Seth W. Mackay-Smith
(74) *Attorney, Agent, or Firm* — Foley & Lardner LLP

(57) ABSTRACT

Provided is an electromagnetic valve capable of stabilizing an injection amount even when injection is performed while an intermediate member continues to be displaced after valve closing and returns to a closed valve standby state. For that purpose, a valve body 303 opens or closes a flow path. A movable iron core 404 moves the valve body 303 in a valve opening direction using a magnetic attraction force. An intermediate member 414 forms a preliminary stroke gap (g1) between the movable iron core 404 and the valve body 303 in a closed valve state. A stopper portion 410c collides with the intermediate member 414 when the intermediate member 414 moves in a direction in which the preliminary stroke gap (g1) is reduced.

8 Claims, 6 Drawing Sheets

(51) Int. Cl.
  *F16K 31/06* (2006.01)
  *F02M 61/16* (2006.01)
  *F02M 61/10* (2006.01)

(52) U.S. Cl.
  CPC ............ *F02M 61/10* (2013.01); *F16K 31/06* (2013.01); *F16K 31/0651* (2013.01); *H01F 7/16* (2013.01); *F02M 51/0621* (2013.01); *F02M 61/168* (2013.01)

(58) Field of Classification Search
  CPC .. F02M 51/0653; F02M 51/066; F02M 61/10; F02M 61/168; F02M 63/0075; F02M 63/0022; F02M 2200/07; F02M 2200/50; F16K 31/0651; F16K 31/06; H01F 7/16
  See application file for complete search history.

(56) References Cited

U.S. PATENT DOCUMENTS

2003/0111625 A1* 6/2003 Kuehne ................ F02M 47/027
  251/129.19
2012/0080542 A1* 4/2012 Imai .................... F02M 51/0671
  239/533.2
2016/0097358 A1   4/2016 Miyake et al.
2017/0218907 A1* 8/2017 Matsukawa ........ F02M 51/0682

FOREIGN PATENT DOCUMENTS

| | | |
|---|---|---|
| JP | 2011-137442 A | 7/2011 |
| JP | 2014-227958 A | 12/2014 |
| WO | WO 03/012284 A1 | 2/2003 |
| WO | WO 2014/141757 A1 | 9/2014 |
| WO | WO 2014/188765 A1 | 11/2014 |

OTHER PUBLICATIONS

Extended European Search Report dated Feb. 25, 2019 in the corresponding Application No. 16838992.2.
Office Action issued in corresponding Japanese Application No. 2017-536696 dated Apr. 9, 2019.

\* cited by examiner

ELECTROMAGNETIC VALVE

TECHNICAL FIELD

The present invention relates to an electromagnetic valve.

BACKGROUND ART

In a fuel injection nozzle, a structure is known in which an intermediate member slidable on both a movable iron core and a valve body and forming a gap in a displacement direction between the movable iron core and the valve body in a closed valve state (refer to, for example, PTL 1). According to such a structure, since the movable iron core collides with the valve body when a valve opens, it is possible to shorten a traveling time by a distance necessary for opening an injection hole and to relatively move the movable iron core and the valve after the valve is opened or closed. As a result, controllability of an injection amount is improved.

CITATION LIST

Patent Literature

PTL 1: JP 2011-137442 A

SUMMARY OF INVENTION

Technical Problem

In a fuel injection device, promotion of finer atomization of spray and stabilization of an injection amount are required. Finer spray atomization is deteriorated as a result of a reduction of fuel flow rate in a low lift period at the beginning of opening of a valve body. The injection amount stabilization is deteriorated as a result of slow convergence of valve operation after valve opening. Therefore, it is necessary for the fuel injection device to rapidly converge operation of the valve body after valve opening as well as steeply starting opening of the valve.

In PTL 1, by providing a gap in a displacement direction on a movable iron core and a valve body, only the movable iron core is operated before starting energization, an impact force at collision is applied to the valve body during valve opening, and a low lift period is shortened. Further, by providing an intermediate member between the movable iron core and the valve body, relative movement between the valve body and the movable iron core is allowed, and an injection amount is stabilized.

However, there is a problem that, when injection is performed while the intermediate member continues to be displaced after valve closing and returns to a closed valve standby state, a gap in the displacement direction becomes small and an injection amount (valve opening behavior) is not stabilized.

Accordingly, an object of the present invention is to provide an electromagnetic valve capable of stabilizing an injection amount even when injection is performed while an intermediate member continues to be displaced after valve closing and returns to a closed valve standby state.

Solution to Problem

To achieve the above-described object, the present invention provides an electromagnetic valve including a valve body, a movable iron core, an intermediate member, and a stopper portion. The valve body opens and closes a flow path. The movable iron core moves the valve body in a valve opening direction using a magnetic attraction force. The intermediate member forms a preliminary stroke gap (g1) between the movable iron core and the valve body in a closed valve state. The stopper portion collides with the intermediate member when the intermediate member moves in a direction in which the preliminary stroke gap (g1) is reduced.

Advantageous Effects of Invention

According to the present invention, an electromagnetic valve can stabilize an injection amount even when injection is performed while an intermediate member continues to be displaced after valve closing and returns to a closed valve standby state. Issues, configurations, and effects other than the above are clarified by descriptions of the following embodiment.

DESCRIPTION OF EMBODIMENTS

Hereinafter, configurations and operation effects of a fuel injection valve (electromagnetic valve) according to first and second embodiments of the present invention will be described with reference to the drawings.

First Embodiment

Figure 1:
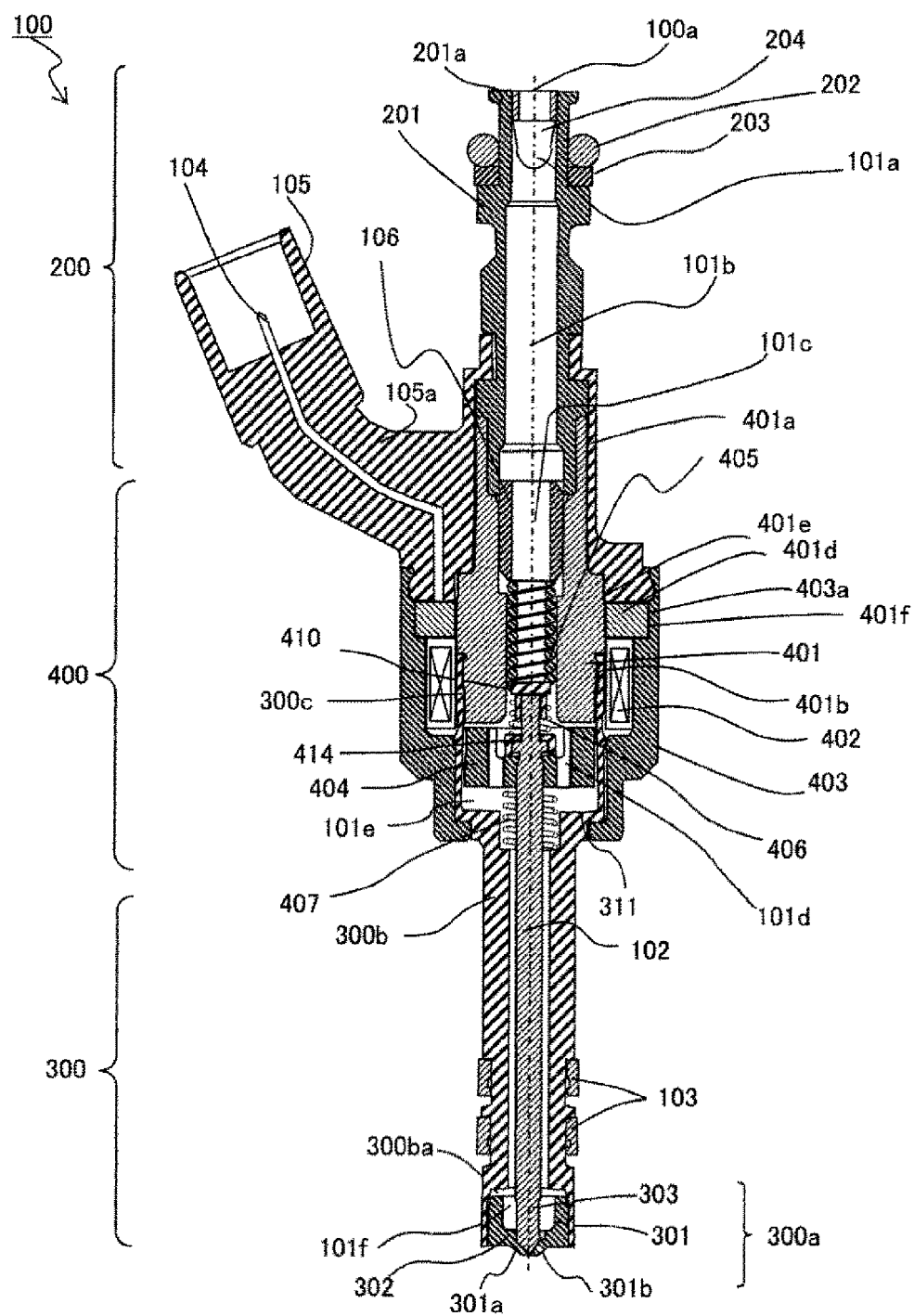
FIG. 1 is a cross-sectional view illustrating a structure of a fuel injection device according to a first embodiment of the present invention, and is a longitudinal cross-sectional view sowing a cut surface parallel to a center axis.
Figure 2:
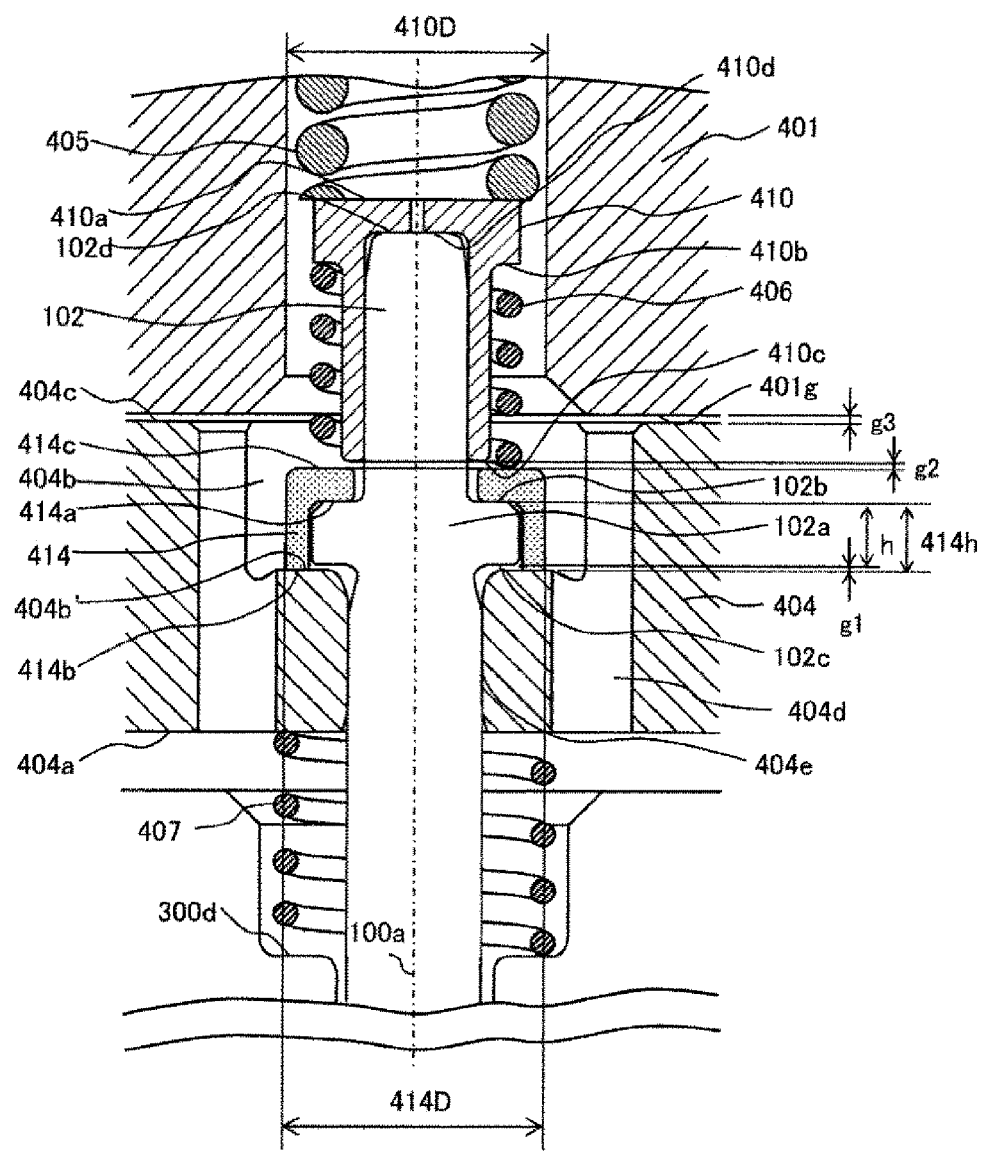
FIG. 2 is an enlarged cross-sectional view of an electromagnetic drive unit of the fuel injection device illustrated in FIG. 1.
Figure 3:
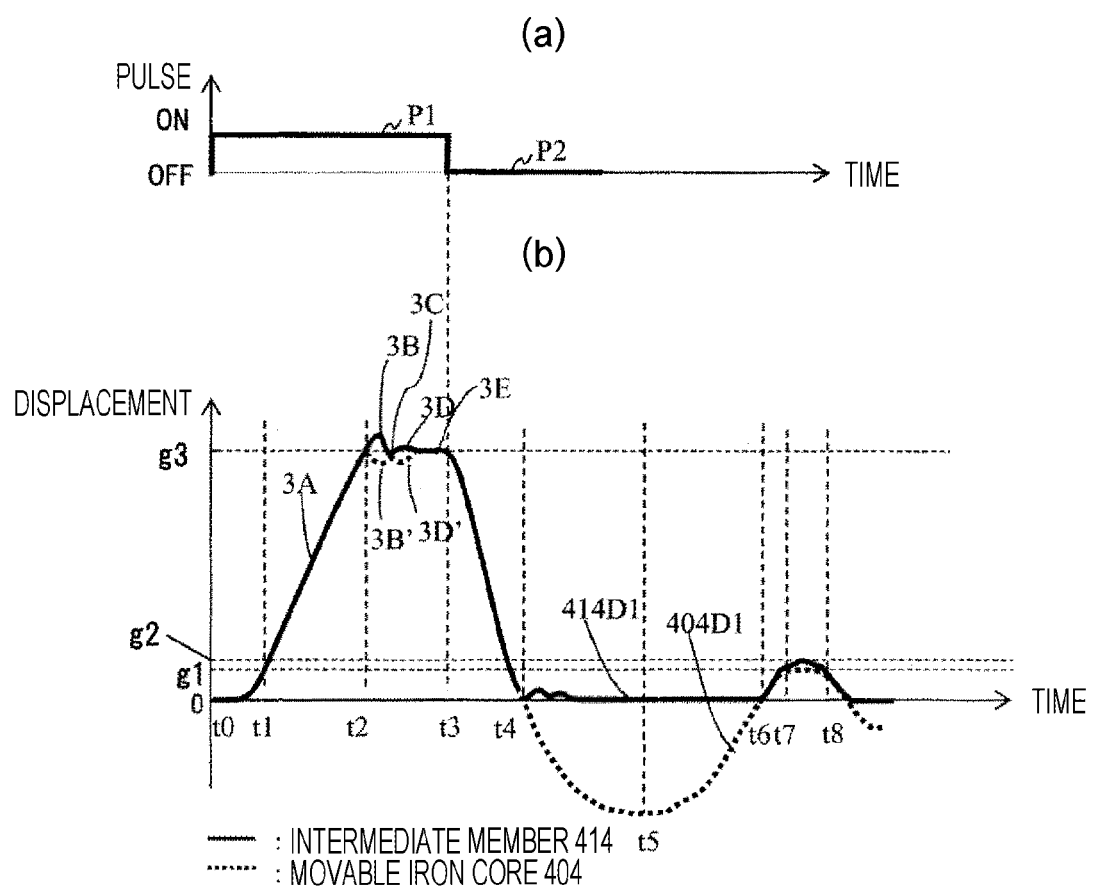
FIG. 3 is a view illustrating operation of a movable portion in the case where a stopper portion is set in response to an injection command pulse, according to the first embodiment of the present invention.
Figure 4:
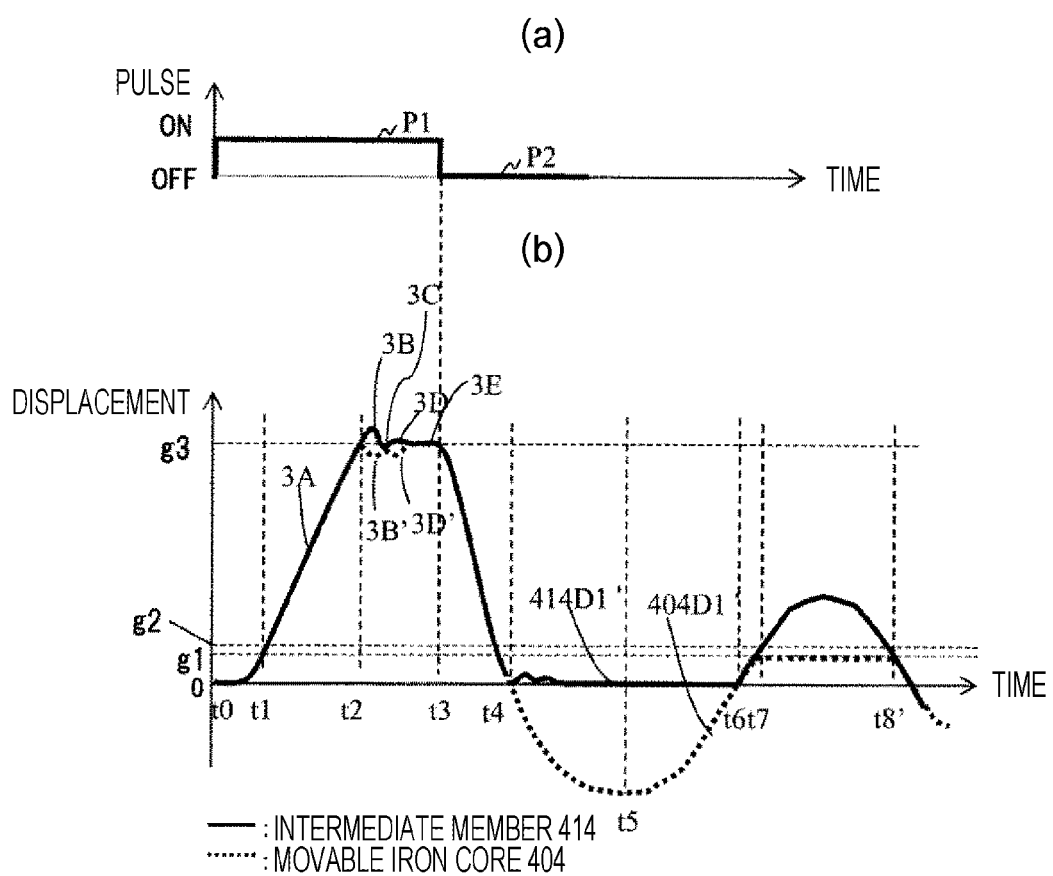
FIG. 4 is a view illustrating operation of the movable portion in the case where the stopper portion is not set in response to the injection command pulse, according to the first embodiment of the present invention.
Figure 5:
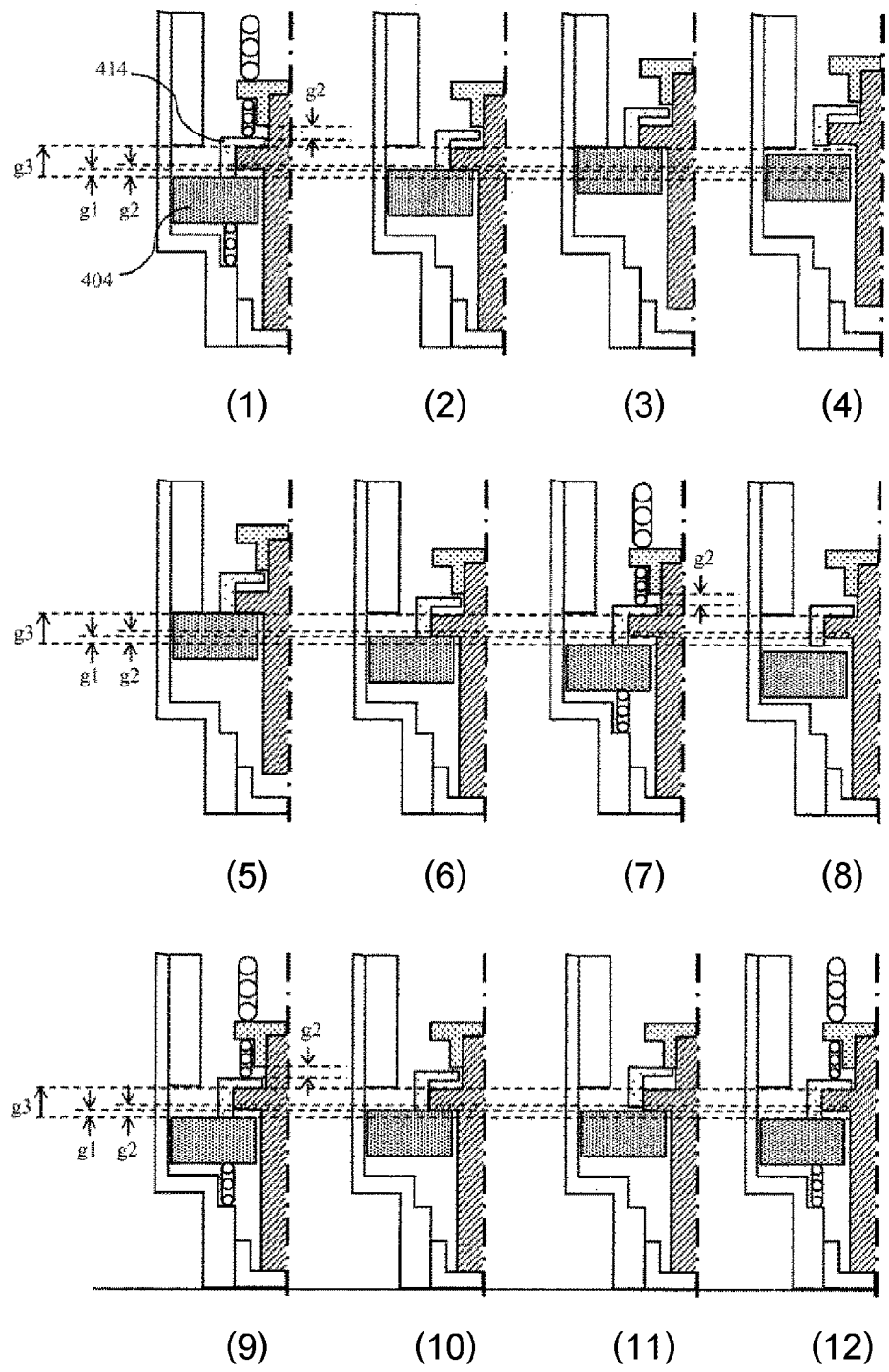
FIG. 5 is a cross-sectional view (schematic view) illustrating operation of the movable portion according to the first embodiment of the present invention.

A configuration of a fuel injection device 100 according to a first embodiment of the present invention will be described with reference to FIGS. 1 to 5. FIG. 1 is a cross-sectional view illustrating a structure of a fuel injection device according to the first embodiment of the present invention, and is a longitudinal sectional view illustrating a cut surface parallel to a center axis 100a. FIG. 2 is an enlarged cross-sectional view of an electromagnetic drive unit 400 illustrated in FIG. 1. FIG. 3 is a view illustrating operation of a movable iron core 404. FIGS. 3(a) and 4(a) illustrate ON/OFF states of an injection command pulse. FIGS. 3(b) and 4(b) illustrate displacement of the movable iron core 404 and an intermediate member 414 when a closed valve state of a plunger rod 102 is set to displacement 0. Operations from t0 to t7 of the movable iron core 404 and the intermediate member 414 illustrated in FIGS. 3(b) and 4(b) are the same. FIG. 5 is a cross-sectional view (schematic view) illustrating operation of a movable portion. In FIG. 5, such as a recessed portion 404b of the movable iron core 404 illustrated in FIG. 2 is omitted as appropriate.

The fuel injection device 100 includes a fuel supply unit 200, a nozzle unit 300, and an electromagnetic drive unit 400. The fuel supply unit 200 supplies fuel. At a tip of the nozzle unit 300, a valve unit 300a for permitting or interrupting fuel flow is provided. The electromagnetic drive unit 400 drives the valve unit 300a. In the present embodiment, a fuel injection device for an internal combustion engine using gasoline as a fuel will be described as an example. The fuel supply unit 200, the valve unit 300a, the nozzle unit 300, and the electromagnetic drive unit 400 indicate corresponding portions with respect to the cross section illustrated in FIG. 1 and do not indicate a single component.

The fuel injection device 100 according to the present embodiment includes the fuel supply unit 200 illustrated at the upper end side of the drawing, the nozzle unit 300 illustrated at the lower end side, and the electromagnetic drive unit 400 provided between the fuel supply unit 200 and the nozzle unit 300. That is, the fuel supply unit 200, the electromagnetic drive unit 400, and the nozzle unit 300 are disposed in this order along a direction of the center axis 100a.

An end portion of the fuel supply unit 200 on the opposite side of the nozzle unit 300 is connected to a fuel pipe, which is not illustrated. An end portion of the nozzle unit 300 on the opposite side of the fuel supply unit 200 is inserted into an attachment hole (insertion hole) formed on an intake pipe, which is not illustrated, or a combustion chamber forming member (such as a cylinder block and a cylinder head) of an internal combustion engine. The fuel injection device 100 receives fuel from a fuel pipe through the fuel supply unit 200 and injects fuel from a distal portion of the nozzle unit 300 into the intake pipe or the combustion chamber. Inside the fuel injection device 100, a fuel passage 101 (101a to 101f) is provided such that fuel flows from the end portion of the fuel supply unit 200 towards the distal portion of the nozzle unit 300 substantially in a direction of the center axis 100a of the fuel injection device 100.

In the following description, regarding both end portions in the direction along the center axis 100a of the fuel injection device 100, the end portion or the end side of the fuel supply unit 200 positioned on the opposite side of the nozzle unit 300 is referred to as a proximal end portion or a proximal end side, and the end portion or the end side of the nozzle unit 300 positioned on the opposite side of the fuel supply unit 200 is referred to as a distal portion or a distal side. Further, each portion included in the fuel injection device will be described by adding "upper" or "lower" based on the vertical direction in FIG. 1. This is merely for simplifying the description. A mounting form of the fuel injection device in the internal combustion engine is not limited to this vertical direction.

(Configuration Description)

Hereinafter, configurations of the fuel supply unit 200, the electromagnetic drive unit 400, and the nozzle unit 300 will be described in detail.

The fuel supply unit 200 includes a fuel pipe 201. A fuel supply port 201a is provided at one end (upper end) of the fuel pipe 201, and the fuel passage 101a is formed inside the fuel pipe 201 so as to penetrate in a direction along the center axis 100a. The other end (lower end) of the fuel pipe 201 is bonded to one end (upper end) of the fixed iron core 401.

An O-ring 202 and a backup ring 203 are provided on an outer peripheral side of the upper end of the fuel pipe 201. The O-ring 202 functions as a seal for preventing fuel leakage when the fuel supply port 201a is attached to a fuel pipe. Further, the backup ring 203 is for backing up the O-ring 202. The backup ring 203 may be formed by laminating a plurality of ring-shaped members. Inside the fuel supply port 201a, a filter 204 for filtering foreign matter mixed in fuel is disposed.

The nozzle unit 300 includes a nozzle body 300b, and the valve unit 300a is formed at the distal portion (lower end) of the nozzle body 300b. The nozzle body 300b is a hollow cylindrical body, and a fuel passage 101f is provided upstream of the valve unit 300a. Further, a movable iron core bearing 311 is provided on a lower fuel passage 101e of the electromagnetic drive unit 400. A tip seal 103 for maintaining airtightness when being mounted in the internal combustion engine is provided on an outer peripheral surface of the distal portion of the nozzle body 300b.

The valve unit 300a includes an injection hole forming member 301, a guide unit 302, and a valve body 303 provided at one end portion (distal portion in the lower end side) of the plunger rod 102.

The injection hole forming member 301 includes a valve seat 301a which is in contact with the valve body 303 and seals fuel and a fuel injection hole 301b which injects fuel. The injection hole forming member 301 is inserted and fixed in a recessed inner peripheral surface 300ba formed at the distal portion of the nozzle body 300b. At this time, the outer periphery of a tip surface of the injection hole forming member 301 and the inner periphery of a tip surface of the nozzle body 300b are welded to seal fuel.

The guide unit 302 is disposed on an inner peripheral side of the injection hole forming member 301 and forms a guide surface at an end side (lower end side) of the plunger rod 102, and the guide unit 302 guides movement of the plunger rod 102 in a direction along the center axis 100a (opening/closing valve direction).

The electromagnetic drive unit 400 includes a fixed iron core 401, a coil 402, a housing 403, a movable iron core 404, an intermediate member 414, a plunger cap 410, a first spring member 405, a third spring member 406, and a second spring member 407. The fixed iron core 401 is also called a fixed core. The movable iron core 404 is called a movable core, a mover, or an armature.

The fixed iron core 401 includes a fuel passage 101c in a center portion and a joining portion 401a with the fuel pipe 201. An outer peripheral surface 401b of the fixed iron core 401 is fitted and joined to a large diameter portion 300c (large diameter inner peripheral portion) of a cylindrical member of the nozzle body 300b, and is fitted and joined to an outer peripheral side fixed iron core 401d on an outer peripheral surface 401e having a larger diameter than the outer peripheral surface 401b. The coil 402 is wound around the fixed iron core 401 and the outer diameter side of the large diameter portion 300c of the cylindrical member.

The housing 403 is provided so as to surround an outer peripheral side of the coil 402 and forms an outer periphery of the fuel injection device 100. An upper end side inner peripheral surface 403a of the housing 403 is connected to an outer peripheral surface 401f of the outer peripheral side fixed iron core 401d. Here, the outer peripheral side fixed iron core 401d is joined to the outer peripheral surface 401e of the fixed iron core 401.

The movable iron core 404 is disposed on a lower end surface 401g side (FIG. 2) of the fixed iron core 401. An upper end surface 404c of the movable iron core 404 faces the lower end surface 401g of the fixed iron core 401 with a gap g3 (FIG. 2) in a closed valve state. An outer peripheral surface of the movable iron core 404 faces an inner peripheral surface of the large diameter portion 300c of the nozzle body 300b with a slight gap formed therebetween. The movable iron core 404 is movably provided in a direction along the center axis 100a on the inner side of the large diameter portion 300c of the cylindrical member.

A magnetic path is formed such that a magnetic flux circulates to the fixed iron core 401, the movable iron core 404, the housing 403, and the large diameter portion 300c of the cylindrical member. A magnetic attraction force generated by the magnetic flux flowing between the lower end surface 401g of the fixed iron core 401 and the upper end surface 404c of the movable iron core 404 attracts the movable iron core 404 in the fixed iron core 401 direction.

The recessed portion 404b recessed from the upper end surface 404c side (FIG. 2) to a lower end surface 404a side is formed in the center portion of the movable iron core 404. A fuel passage hole 404d is formed on the upper end surface 404c and a bottom surface 404b' of the recessed portion 404b as a fuel passage 101d penetrating to the lower end surface 404a side in a direction along the center axis 100a. A through hole 404e is formed on the bottom surface 404b' of the recessed portion 404b so as to penetrate to the lower end surface 404a side in a direction along the center axis 100a. The plunger rod 102 is provided so as to pass through the through hole 404e. A plunger cap 410 is fitted and fixed to the plunger rod 102. The plunger rod 102 has a thick diameter portion 102a.

The intermediate member 414 is a cylindrical member having the recessed portion 404b functioning as a step on inner and outer peripheries. An inner peripheral side surface 414a comes into contact with an upper surface 102b of the thick diameter portion 102a of the plunger rod 102. An outer peripheral side surface 414b (lower end surface) comes into contact with the bottom surface 404b' of the recessed portion 404b of the movable iron core 404. The gap g1 is provided between the lower surface 102c of the thick diameter portion 102a and the bottom surface 404b' of the recessed portion 404b of the movable iron core 404. The above-described gap g1 is the length obtained by subtracting the height h present between the upper surface 102b and the lower surface 102c of the thick diameter portion 102a of the plunger rod 102 from the height 414h of the recessed step of the intermediate member 414.

A stopper portion 410c of the plunger cap 410 is disposed upstream of an upper end surface 414c of the intermediate member 414 via a gap g2.

As illustrated in FIG. 1, an upper end portion of the first spring member 405 comes into contact with a lower end surface of a spring force adjusting member 106. As illustrated in FIG. 2, a lower end portion of the first spring member 405 comes into contact with an upper spring bearing 410a of the plunger cap 410 and energizes the plunger rod 102 downward via the plunger cap 410. An upper end portion of the third spring member 406 comes into contact with a lower spring bearing 410b of the plunger cap 410. A lower end portion of the third spring member 406 comes into contact with the upper end surface 414c of the intermediate member 414 and energizes the intermediate member 414 in a valve closing direction.

An upper end portion of the second spring 407 comes into contact with the lower end surface 404a of the movable iron core 404. The lower end portion of the second spring 407 comes into contact with a stepped portion 300d of the nozzle body 300b to energize the movable iron core 404 in a valve opening direction. That is, the electromagnetic valve (fuel injection device 100) according to the present embodiment includes the first spring member 405, the third spring member 406, and the second spring member 407. The first spring member 405 energizes the valve body 303 in a valve closing direction. The third spring member 406 is attached to the stopper portion 410c or the valve body 303 and energizes the intermediate member 414 in a direction in which the preliminary stroke gap (g1) is increased. The second spring member 407 energizes the movable iron core 404 in a valve opening direction. A spring force of the first spring member 405 is larger than a spring force of the third spring member 406, and the spring force of the third spring member 406 is larger than a spring force of the second spring member 407. As a result, the preliminary stroke gap (g1) is formed in a valve closed state.

In other words, the intermediate member 414 uses the third spring member 406 to energize the valve body 303 and the movable iron core 404 in the valve closing direction, and accordingly the preliminary stroke gap (g1) in the valve closed state is formed.

As illustrated in FIG. 1, the coil 402 is wound around a bobbin and assembled to the fixed iron core 401 and the outer peripheral side of the large diameter portion 300c of a cylindrical member. A resin material is molded around the coil 402. A connector 105 having a terminal 104 drawn out from the coil 402 is integrally molded with the resin material used for this mold.

(Description of Operation)

Next, operation of the fuel injection device 100 in this embodiment and characteristics of the present invention will be described. The operation and the characteristics will be described mainly with reference to FIG. 2 which is an enlarged view of the electromagnetic drive unit 400 and FIGS. 3, 4, and 5 which illustrates operation of a movable portion. FIGS. 3(a) and 4(a) are the same, and operations of the movable iron core 404 and the intermediate member 414 from t0 to t7 are the same as those in FIGS. 3(b) and 4(b).

(Definition of Closed Valve State and Description of Gap)

In a closed valve state in which the coil 402 is not energized, the plunger rod 102 comes into contact with the valve seat 301a to close a valve, due to a force obtained by subtracting an energizing force of the third spring member 406 from an energizing force of the first spring member 405 and an energizing force of the second spring member 407, which energize the plunger rod 102 in a valve closing direction. This state is called a closed valve rest state. At this time, the movable iron core 404 is in contact with the outer peripheral side surface 414b (lower end surface) of the intermediate member 414 and is disposed in a valve closing position.

In the closed valve state of the fuel injection device according to the present embodiment, a gap related to movable components relating to valve opening operation is formed as follows. As illustrated in FIG. 2, the gap g2 is provided between the upper end surface 414c of the intermediate member 414 and the stopper portion 410c of the plunger cap 410. The gap g1 is included between the bottom surface 404b' of the recessed portion 404b of the movable iron core 404 and the lower surface 102c of the thick diameter portion 102a of the plunger rod 102. The relationship between g1 and g2 is configured as g2>g1.

(Operation after Energization)

After energizing the coil 402 (P1), a magnetomotive force is generated by an electromagnet including the fixed iron core 401, the coil 402, and the housing 403. Due to this magnetomotive force, a magnetic flux circulating in a magnetic path including the fixed iron core 401 configured to surround the coil 402, the housing 403, the large diameter portion 300c (thick diameter portion) of the nozzle body 300b, and the movable iron core 404. At this time, a magnetic attractive force acts between the upper end surface 404c of the movable iron core 404 and the lower end surface 401g of the fixed iron core 401, and the movable iron core 404 and the intermediate member 414 are displaced toward the fixed iron core 401. Thereafter, as illustrated in FIG. 3, the movable iron core 404 is displaced by g1 (between t0 and t1) until the movable iron core 404 comes into contact with the lower surface 102c of the thick diameter portion 102a of the plunger rod 102. At this time, the plunger rod 102 does not move.

That is, the movable iron core 404 and the intermediate member 414 are displaced as illustrated in FIGS. 5(1) and 5(2).

Then, as illustrated in FIG. 3, when the movable iron core 404 is in contact with the lower surface 102c of the thick diameter portion 102a of the plunger rod 102 at the timing of t1, the plunger rod 102 receives an impact force from the movable iron core 404 and is pulled up, and the plunger rod 102 is separated from the valve seat 301a. As a result, a gap is formed in a valve seat portion, and a fuel passage is opened. The plunger rod 102 rises steeply (3A) to start valve opening by receiving an impact force. At this time, the movable iron core 404 and the intermediate member 414 perform the same operation as the plunger rod 102.

Then, when the plunger rod 102 is displaced by g3 and the upper end surface 404c of the movable iron core 404 comes into contact with the lower end surface 401g of the fixed iron core 401 at the timing t2, the intermediate member 414 is displaced upward (3B), the movable iron core 404 is displaced downward (3B'), and the movable iron core 404 and the fixed iron core 401 again collide with each other (3C: contacted). After that, the movable iron core 404 and the fixed iron core 401 are separated again, and the plunger rod 102 moves upward (3D), and the movable iron core 404 moves downward (3D'), and then those are stabilized to be displaced by g3 (3E).

That is, the movable iron core 404 and the intermediate member 414 are displaced as illustrated in FIGS. 5(3) to 5(5).

(Operation and Effect)

In the present embodiment, as illustrated in FIG. 2, the intermediate member 414 is provided below the third spring 406 which generates a spring force in the movable iron core 404 and the plunger rod 102. The intermediate member 414 is disposed by coming into contact with the bottom surface 404b' of the recessed portion 404b of the movable iron core 404 and the upper surface 102b of the thick diameter portion of the plunger rod 102. Therefore, when the movable iron core 404, the plunger rod 102, and the intermediate member 414 open a valve, and the movable iron core 404 and the fixed iron core 401 collide at the timing t2, as illustrated in FIG. 3, the movable iron core 404 moves in a valve closing direction and the intermediate member 414 and the plunger rod 102 continue to move in a valve opening direction.

In this state, no spring force acting between the movable iron core 404 and the plunger rod 102 is generated, and the spring force is separated. Therefore, the spring force which varies with the movement of the movable iron core 404 is not transmitted to the plunger rod 102. On the contrary, the spring force which varies with the movement of the plunger rod 102 is not transmitted to the movable iron core 404. The forces mutually independently vibrate with collision (3B and 3B').

Further, when colliding again (3C), the movable iron core 404 bounces in the valve closing direction (3D'), and the plunger rod 102 bounces in the valve opening direction (3D). However, they do not exchange mutual forces and move without exerting the spring forces which vary with the movement of each other, and the plunger rod 102 and the movable iron core 404 have small forces. Therefore, convergence of bounding of movable components becomes faster (3E), as compared with the case where a spring force that varies with the movement of each other is exerted. This effect makes it possible to stabilize a fuel injection amount.

Further, in a valve closed state, the gap g1 where the movable iron core 404 is displaced is formed by a difference between the height 414h of a recessed portion of the intermediate member 414 and the height h of the thick diameter portion 102a of the plunger rod 102 (the height h present between the upper surface 102b and the lower surface 102c of 102a). Therefore, the gap is determined according to a component size, and adjustment in an assembling process becomes unnecessary. As a result, the assembling process can be simplified.

When energization to the coil 402 is interrupted (P2) at the timing t3, a magnetic force starts to disappear and valve closing operation is performed by an energizing force of a spring in a valve closing direction. After displacement of the plunger rod 102 becomes zero at the timing t4, the plunger rod 102 comes into contact with the valve seat 301a, and a valve is completely closed. Further, since the intermediate member 414 is in contact with the upper surface 102b of the thick diameter portion 102a of the plunger rod 102, the displacement does not become smaller than zero. On the other hand, the movable iron core 404 is further displaced in the valve closing direction even after the displacement of the intermediate member 414 becomes zero at the timing t4. After the movable iron core 404 is most displaced in the valve closing direction at the timing t5, the movable iron core 404 is displaced in the valve opening direction such that the second spring member causes the displacement to become zero again. The displacement again becomes zero at the timing t6, and the movable iron core 404 and the intermediate member 414 collide with each other.

That is, the movable iron core 404 and the intermediate member 414 are displaced as illustrated in FIGS. 5(5) to 5(9).

At the timing t7, the movable iron core 404 collides with the lower surface 102c of the thick diameter portion 102a of the plunger rod 102. FIG. 4 illustrates the case where the stopper portion 410c is not included, and the intermediate member 414 is displaced further, in the valve opening direction, than the preliminary stroke gap (g1) between t7 and t8'. Then, the movable iron core 404 also moves in the direction in which the preliminary stroke gap (g1) is reduced, in accordance the displacement. As a result, the preliminary stroke gap (g1) does not exist for a certain time. In this state, when the next pulse signal is sent, the movable iron core 404 cannot open the plunger rod 102 since the preliminary stroke gap (g1) does not exist, and fuel cannot be injected.

Therefore, in the present embodiment, to solve such a problem, a characteristic upper spring bearing 410a (stopper portion 410c) is provided. That is, the electromagnetic valve (fuel injection device 100) according to the present embodiment includes the valve body 303, the movable iron core 404, and the intermediate member 414. The valve body 303 opens and closes a flow passage. The movable iron core 404 moves the valve body 303 in a valve opening direction using a magnetic attraction force. The intermediate member 414 forms the preliminary stroke gap (g1) between the movable iron core 404 and the valve body 303. Further, the electromagnetic valve includes the stopper portion 410c which collides with the intermediate member 414 when the intermediate member 414 moves in a direction in which the preliminary stroke gap (g1) is reduced.

In this case, as illustrated in FIG. 3, the intermediate member 414 is further displaced, in the valve opening direction, than the preliminary stroke gap (g1) at the timing t7 to t8, and collides with the stopper portion 410c when the intermediate member 414 is displaced by g2. Due to this collision, the intermediate member 414 is again displaced in the valve closing direction. Consequently, a duration of the state in which the preliminary stroke gap (g1) of the movable iron core 404 does not exist can be shortened. As a result, as compared with the case illustrated in FIG. 4, in the case illustrated in FIG. 3 in which the present embodiment is applied, return to the closed valve initial state can be made faster, and the stability of a fuel injection amount is improved.

That is, the movable iron core 404 and the intermediate member 414 are displaced as illustrated in FIGS. 5(10) to 5(12).

Again, as illustrated in FIG. 3, during the valve closing operation, the intermediate member 414 collides with the stopper portion 410c when the intermediate member 414 is displaced further, in the valve opening direction, than the preliminary stroke gap (g1) and is displaced to g2. That is, in the electromagnetic valve (fuel injection device 100) according to the present embodiment, the stopper portion 410c and the intermediate member 414 are disposed via a gap (g2) larger than the preliminary stroke gap (g1). The stopper portion 410c is disposed at an upstream side end portion of the valve body 303. In other words, the stopper portion 410c is fixed to the valve body 303.

Accordingly, only the case where the intermediate member 414 is displaced in the valve opening direction can be limited.

Further, in the present embodiment, the gap (g2) between the stopper portion 410c and the intermediate member 414 is determined solely by a component size, and is formed by subtracting the height from the stopper portion 410c of the plunger cap 410 to an inner peripheral side surface 410d of the plunger cap 410 and the height from the inner peripheral side surface 414a of the intermediate member 414 to the upper end surface 414c of the intermediate member 414 from the height from an upper end surface 102d of the plunger rod 102 to the upper surface 102b (upper end surface) of the thick diameter portion 102a of the plunger rod 102. Therefore, adjustment in the assembling process is not needed, and the assembling process can be simplified.

Further, in the configuration of the present embodiment, an outer diameter 414D of the intermediate member 414 is smaller than an inner diameter 401D of the fixed iron core. Therefore, when the fuel injection device is assembled, after the gap g1 is determined by the step height 414h of the intermediate member 414 and the height h of the thick diameter portion 102a of the plunger rod 102, in a state where the spring force adjusting member 106 and the first spring member 405 are not inserted, the plunger cap 410, the plunger rod 102, the third spring member 406, and the intermediate member 414 can be integrated in advance into the fuel injection device and therefore can be easily assembled, and the gap g1 can be stably controlled. In the present embodiment, the outer diameter 414D of the intermediate member 414 is smaller than the inner diameter 410D of the fixed iron core 401. However, what is required is that the outermost diameter of the member to be assembled in advance is smaller. In the case where the outermost diameter of the plunger cap 410 is larger than the outer diameter 414D (the outermost diameter) of the intermediate member 414, the outermost diameter of the plunger cap 410 needs to be smaller than the inner diameter 410D of the fixed iron core 401.

In the present embodiment, even if the movable iron core 404 does not have the recessed portion 404b and is the same surface as 404c, it is possible to obtain the same operation effect as the present embodiment. By providing the recessed portion 404b of the movable iron core 404, the intermediate member 414 can be disposed further downward, the length of the plunger rod 102 in the valve opening/closing direction can be shortened, and the plunger rod 102 can be precisely formed.

As described above, according to the present embodiment, an injection amount can be stabilized even when injection is performed while the intermediate member 414 continues to be displaced after valve closing and returns to a closed valve standby state. That is, the stopper portion 410c can reduce the displacement amount of the intermediate member 414 during valve closing and reduce the period to reduce the preliminary stroke gap (g1). As a result, the fuel injection amount can be further stabilized.

Second Embodiment

Figure 6:
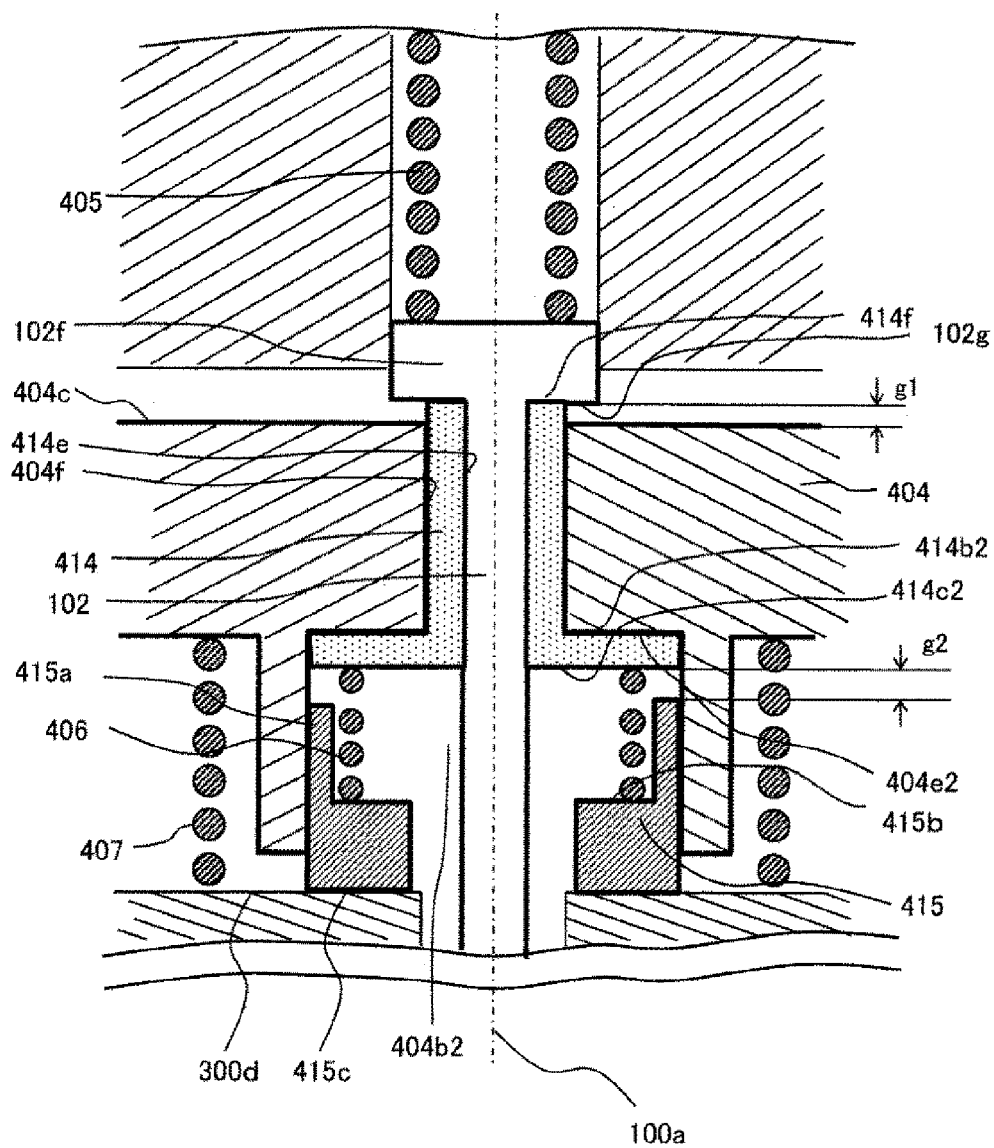
FIG. 6 is a cross-sectional view illustrating a structure of a fuel injection device according to a second embodiment of the present invention, and is an enlarged cross-sectional view of an electromagnetic drive unit.

A configuration of a second embodiment according to the present invention will be described with reference to FIG. 6. In the drawing, descriptions of components denoted by the same reference signs as in the first embodiment will be omitted since there is no difference in operation effect.

In the present embodiment, in the closed valve state, the movable iron core 404 has a recessed portion 404b2 recessed from a lower end surface side toward an upper end surface side of a center portion. A through hole 404f penetrating to the upper end surface side of the movable iron core 404 in a direction along a center axis 100a is formed on a bottom surface 404e2 of the recessed portion 404b2. A projected intermediate member 414 is inserted into the through hole 404f from a downstream side, and an upper surface 414b2 of a thick diameter portion is in contact with the recessed portion 404b2 of the movable iron core 404. Further, a through hole 414e penetrating in a direction along the center axis 100a is formed in the intermediate member 414. A plunger rod 102 is provided so as to pass through the through hole 414e. In the closed valve state, an upper end surface 414f of the intermediate member 414 and a lower end surface 102g of a plunger rod thick diameter portion 102f is in contact with each other.

The height from the upper surface 414b2 to the upper end surface 414f of the thick diameter portion of the intermediate member 414 is larger than the height from the bottom surface 404e2 of a recessed portion of the movable iron core 404 to an upper end surface 404c by g1.

Here, a configuration of a third spring member 406 will also be described.

The third spring member 406 is stored in the recessed portion 404b2 of the movable iron core 404. One end portion of the third spring member 406 is engaged with a bottom surface 415b of the recessed portion recessed from the upper end side to the lower end surface side of the center portion of a stopper 415 stored in the recessed portion 404b2 of the movable iron core 404. The other end portion of the third spring member 406 is engaged with a lower end surface 414c2 of the intermediate member 414. That is, the electromagnetic valve (fuel injection device 100) of the present embodiment includes the third spring member 406 which energizes the intermediate member 414 in a valve opening direction. The intermediate member 414 energizes a valve body 303 and the movable iron core 404, using the third spring member 406, in a valve opening direction, and a preliminary stroke gap (g1) in a closed valve state is formed.

In the present embodiment, a lower end surface 415c of the stopper 415 and a stepped portion 300d of a nozzle body 300b are in contact with each other. However, the stopper 415 is fixed to the movable iron core 404 and forms a gap with the stepped portion 300d of the nozzle body 300b.

Further, the stopper portion 415a of the stopper 415 is disposed with respect to the lower end surface 414c2 of the intermediate member 414 via a gap (g2) larger than the preliminary stroke gap (g1).

Further, in the present embodiment, it is possible to reduce the time during which the preliminary stroke gap g1 collides with the stopper portion 415a while the intermediate member 414 is displaced to the downstream side after the opening/closing valve operation and to further stabilize the injection amount.

The present invention is not limited to the above-described embodiments and includes various variations. For example, the above-described embodiments describe the present invention in detail for clarification, and every configurations described above may not be necessarily included. Further, a configuration of each embodiment can be partially replaced to a configuration of the other embodiment. Furthermore, a configuration of each embodiment can be added to the configuration of the other embodiment. Further, a part of a configuration of each embodiment can be added to, deleted from, and replaced from the other configuration.

REFERENCE SIGNS LIST 100 fuel injection device
101 fuel passage
102 plunger rod
200 fuel supply unit
300 nozzle unit
301a valve seat
301b fuel injection hole
311 movable iron core bearing
400 electromagnetic drive unit
401 fixed iron core
402 coil
403 housing
404 movable iron core
405 first spring member
406 third spring member
407 second spring member
414 intermediate member

The invention claimed is:

1. An electromagnetic valve, comprising:
a valve body configured to open and close a flow path;
a movable iron core configured to move the valve body in a valve opening direction using a magnetic attraction force;
an intermediate member configured to form a preliminary stroke gap (g1) between the movable iron core and the valve body in a closed valve state;
a stopper portion which collides with the intermediate member when the intermediate member moves in a direction in which the preliminary stroke gap (g1) is reduced,
the stopper portion and the intermediate member being disposed via a gap (g2) larger than the preliminary stroke gap (g1), and
the intermediate member being configured such that, after the movable iron core collides with the valve body, the intermediate member moves upward independently of the movable iron core and collides with the stopper portion;
a first spring member configured to energize the valve body in a valve closing direction;
a third spring member attached to the stopper portion or the valve body and configured to energize the intermediate member in a direction in which the preliminary stroke gap (g1) is increased; and
a second spring member configured to energize the movable iron core in a valve opening direction,
wherein a spring force of the first spring member is larger than a spring force of the third spring member, and the spring force of the third spring member is larger than a spring force of the second spring member.

2. The electromagnetic valve according to claim 1, wherein the stopper portion is disposed at an upstream end portion of the valve body.

3. The electromagnetic valve according to claim 1, wherein the third spring member is configured to energize the intermediate member in a valve closing direction, and
wherein when the intermediate member energizes the valve body and the movable iron core in a valve closing direction using the third spring member, the preliminary stroke gap (g1) in the closed valve state is formed.

4. The electromagnetic valve according to claim 3, wherein the stopper portion is disposed upstream of the intermediate member via the gap (g2).

5. The electromagnetic valve according to claim 1, wherein the third spring member is configured to energize the intermediate member in a valve opening direction,
wherein when the intermediate member energizes the valve body and the movable iron core in a valve opening direction using the third spring member, the preliminary stroke gap (g1) in the closed valve state is formed.

6. The electromagnetic valve according to claim 5, wherein the stopper portion is disposed upstream of the intermediate member via the gap (g2).

7. An electromagnetic valve, comprising:
a valve body configured to open and close a flow path;
a movable iron core configured to move the valve body in a valve opening direction using a magnetic attraction force;
an intermediate member configured to form a preliminary stroke gap (g1) between the movable iron core and the valve body in a closed valve state; and
a stopper portion which collides with the intermediate member when the intermediate member moves in a direction in which the preliminary stroke gap (g1) is reduced,
wherein the stopper portion and the intermediate member are disposed via a gap (g2) larger than the preliminary stroke gap (g1), and
wherein the stopper portion is fixed to the valve body.

8. An electromagnetic valve, comprising:
a valve body configured to open and close a flow path;
a movable iron core configured to move the valve body in a valve opening direction using a magnetic attraction force;
an intermediate member configured to form a preliminary stroke gap (g1) between the movable iron core and the valve body in a closed valve state;
a stopper portion which collides with the intermediate member when the intermediate member moves in a direction in which the preliminary stroke gap (g1) is reduced;
a first spring member configured to energize the valve body in a valve closing direction; and
a third spring member attached to the stopper portion or the valve body and configured to energize the intermediate member in a direction in which the preliminary stroke gap (g1) is increased,
wherein, a spring force of the first spring member is larger than a spring force of the third spring member.

* * * * *